United States Patent
Ashdown

(10) Patent No.: US 11,085,819 B2
(45) Date of Patent: Aug. 10, 2021

(54) SYSTEM AND METHOD OF CLASSIFYING SPECTRAL POWER DISTRIBUTIONS

(71) Applicant: Suntracker Technologies Ltd., Victoria (CA)

(72) Inventor: Ian Edward Ashdown, West Vancouver (CA)

(*) Notice: Subject to any disclaimer, the term of this patent is extended or adjusted under 35 U.S.C. 154(b) by 0 days.

(21) Appl. No.: 17/015,496

(22) Filed: Sep. 9, 2020

(65) Prior Publication Data

US 2021/0088382 A1  Mar. 25, 2021

Related U.S. Application Data

(60) Provisional application No. 62/903,650, filed on Sep. 20, 2019.

(51) Int. Cl.
*G01J 3/02* (2006.01)
*H05B 47/14* (2020.01)
*A01G 7/04* (2006.01)

(52) U.S. Cl.
CPC ............ *G01J 3/0275* (2013.01); *A01G 7/045* (2013.01); *G01J 3/0264* (2013.01); *H05B 47/14* (2020.01)

(58) Field of Classification Search
CPC .... G01J 3/02; G01J 3/26; G01J 3/0264; G01J 3/0275; H05B 47/14; A01G 7/045
See application file for complete search history.

(56) References Cited

U.S. PATENT DOCUMENTS

2012/0010861 A1* 1/2012 Hu .................. H05B 45/22 703/2

OTHER PUBLICATIONS

CIE 15:2004, "Colorimetry, Third Edition," Section 9.5.
CIE 13.3-1995, "Method of Measuring and Specifying Colour Rendering Properties of Light Sources".
ANSI/ASASBE S640 Jul. 2017, "Quantities and Units of Electromagnetic Radiation for Plants (Photosynthetic Organisms)".
Terashima, I., et al. 2009. "Green Light Drives Leaf Photosynthesis More Efficiently than Red Light in Strong White Light: Revisiting the Enigmatic Question of Why Leaves are Green," Plant & Cell Physiology 50(4):684-697.
Craig, D. S., and E. S. Runkle. 2013. "A Moderate to High Red to Far-red Light Ratio from Light-Emitting Diodes Controls Flowering of Short-Day Plants," J. American Society for Horticultural Science 138(3):167-172.

(Continued)

*Primary Examiner* — Abdullahi Nur

(57) ABSTRACT

A means to automate, using fuzzy logic, the classification of spectral power distributions of optical radiation for lighting systems, and more particularly horticultural lighting systems, is presented. After inputting the spectral power distribution of optical radiation from one or more light sources, radial basis function weights for the spectral power distribution are determined and fuzzified preparatory to fuzzy logic classification. Fuzzy if-then rules are then applied, and an aggregate of the rule votes from the fuzzy if-then rules applied is used to classify the spectral power distribution. The system utilizes a spectral sensor, a fuzzifier module, a fuzzy rule database, fuzzy rule engine, an output fuzzifier module, and a means of displaying the spectral power distribution classification.

19 Claims, 12 Drawing Sheets

(56) References Cited

OTHER PUBLICATIONS

Sager, J. C., et al. 1988. "Photosynthetic Efficiency and Phytochrome Equilibria Determination Using Spectral Data," Trans, ASABE 31(5):1882-1889.
Both, A.-J., et al. 2017. "Proposed Product Label for Electric Lamps Used in the Plant Sciences," HortTechnology 27 (4):544-549.
Johkan, M. et al. 2012. "Effect of Green Light Wavelength and Intensity on Photomorphogenesis and Photosynthesis in *Lactuca sativa*," Environmental and Experimental Botany 75:128-133.
Moss, R. A., and W. E. Loomis. 1952. Absorption Spectra of Leaves. I. The Visible Spectrum, Plant Physiology 27 (2):370-391.
McCree, K. J. 1972. "The Action Spectrum, Absorptance and Quantum Yield of Photosynthesis in Crop Plants," Agricultural Meteorology 9:191-216.
Maloney, L. 1986. "Evaluation of Linear Models of Surface Spectral Reflectance with Small Number of Parameters," J. Optical Society of America 3(10):1673-1683.
Westland, S. et al. 2000. "Colour Statistics of Natural and Man-made Surfaces," Sensor Review 20(1):50-55.
Westland, S., and C. Ripamonti. 2004. "Computational Color Science using Matlab," Chapter 10. Chichester, UK: John Wiley & Sons.
Buhmann, M. D., and J. Jäger. 2000. "On Radial Basis Functions," Acta Numerica 9:1-38.
Shamir, L. 2006. "Human Perception-based Color Segmentation Using Fuzzy Logic," Proc. 2006 Int. Conference on Image Processing, Computer Vision & Pattern Recognition, vol. 2.
Martin Buhmann and Janin Jager. 2019. "On Radial Basis Functions", Snapshots of Modern Mathematics from Oberwolfach; No. 2:1-16.

\* cited by examiner

SYSTEM AND METHOD OF CLASSIFYING SPECTRAL POWER DISTRIBUTIONS

TECHNICAL FIELD

The subject matter of the present invention relates to the field of horticultural lighting systems, and more particularly is concerned with a system and method of classifying spectral power distributions.

BACKGROUND

The spectral power distribution of optical radiation from approximately 280 nm (UV-B) to 800 nm (far-red), sometimes referred to as "photobiologically active radiation," strongly influences the photosynthesis, photomorphogenesis, photoperiodism, phototropism, shade avoidance, and secondary metabolite production of plants.

With the introduction of quasimonochromatic light-emitting diodes (LEDs) and phosphor conversion, horticulturalists have unprecedented means of tailoring the spectral power distribution (SPD) of horticultural luminaires to the needs of specific plant species for optimal growth and health. Unfortunately, there is no agreed-upon means of specifying SPDs other than using generic color terms such as "blue" and "red," or else publishing the SPD as a table of normalized spectral power values at fixed wavelengths.

This problem is exacerbated by horticultural research papers referring to "ultraviolet" radiation and "blue," "green," "yellow," "red" and "far-red" light. The papers may include the names of manufacturers' products for horticultural luminaires or publish measured SPDs, but this leaves open the question of whether other manufacturers' products with similar SPDs will produce the same results as reported in the studies.

White light sources for architectural applications are typically characterized by luminous flux output (stated in lumens), correlated color temperature (CIE 15:2004, "Colorimetry, Third Edition," Section 9.5), and color rendering metrics such as CRI (CIE 13.3-1995, "Method of Measuring and Specifying Colour Rendering Properties of Light Sources"). These three metrics are sufficient to fully characterize the visual appearance of the light source (FIG. 1).

Light sources for horticultural applications, on the other hand, are typically characterized by photosynthetically active radiation (PAR) output, which is stated in micromoles per steradian per second (ANSI/ASASBE S640 July 2017, "Quantities and Units of Electromagnetic Radiation for Plants (Photosynthetic Organisms)"). This is adequate for horticulturalists to determine whether the light sources will provide sufficient Daily Light Integral (ibid) for optimal plant growth, but it says nothing about the spectral power distribution requirements.

While literally hundreds of research papers address the effects of different SPDs on plants, one in particular illustrates the problem: Terashima, I., et al. 2009. "Green Light Drives Leaf Photosynthesis More Efficiently than Red Light in Strong White Light: Revisiting the Enigmatic Question of Why Leaves are Green," Plant & Cell Physiology 50(4):684-697. Despite being an academic review paper with over 60 references, the authors make no attempt to define the meaning of "blue," "green," "red," and "white" light.

Another example is Craig, D. S., and E. S. Runkle. 2013. "A Moderate to High Red to Far-red Light Ratio from Light-Emitting Diodes Controls Flowering of Short-Day Plants," J. American Society for Horticultural Science 138(3):167-172. The authors somewhat arbitrarily define "red" as optical radiation with wavelengths between 600 nm and 700 nm, and "far-red" as optical radiation with wavelengths between 700 nm and 800 nm. This approach makes some sense in that horticultural luminaire manufacturers typically use quasimonochromatic LEDs with peak wavelengths varying between approximately 655 nm and 670 nm for "red," and between approximately 720 nm and 750 nm for "far-red." The flowering response described by Craig and Runkle (2013) depends on phytochrome, a photopigment with two isoforms $P_r$ and $P_{fr}$ whose spectral absorptances are shown in FIG. 2. The ratio of these two isoforms depends on the red to far-red light ratio (R:FR) incident upon the plant (Sager, J. C., et al. 1988. "Photosynthetic Efficiency and Phytochrome Equilibria Determination Using Spectral Data," Trans. ASABE 31(5):1882-1889). Phytochrome therefore acts as a photobiological switch to control many plant processes, including flowering.

The authors assumed that there was no significant overlap of the SPDs for the red and far-red LEDs. However, this assumption is unfortunately invalid. FIG. 3 shows the range of spectral power distributions for Lumileds SunPlus™ 20 Deep Red LEDs, which are mostly confined to the range of 600 nm to 700 nm. However, FIG. 4 shows the range of spectral power distributions for Lumileds SunPlus™ 20 Far Red LEDs, wherein there is significant overlap with the "red" spectral region of 600 nm to 700 nm, especially for the lowest peak wavelength of 720 nm. The R:FR ratio (as defined by Craig and Runkle) of a horticultural luminaire utilizing red LEDs with a nominal 660 nm center wavelength and far-red LEDs with a nominal 735 nm center wavelength therefore depends not only the relative optical power emitted by LEDs, but also their actual center wavelengths. The center wavelengths can vary as shown in FIG. 3 and FIG. 4 due to LED color binning tolerances, and so the R:FR ratio may also vary considerably between luminaires with the same relative optical power emission for their red and far-red LEDs.

A proposed product label for horticultural light sources, shown in FIG. 5, was presented in Both, A.-J., et al. 2017. "Proposed Product Label for Electric Lamps Used in the Plant Sciences," HortTechnology 27(4):544-549. Expanding on the definition of Craig and Runkle (2013), the authors proposed dividing the spectrum into six unnamed "wavebands" as shown in TABLE 1:

TABLE 1

| Waveband |
| --- |
| 300 nm-399 nm |
| 400 nm-499 nm |
| 500 nm-599 nm |
| 600 nm-699 nm |
| 700 nm-799 nm |
| 800 nm-900 nm | which roughly correspond to "ultraviolet" (300 nm-399 nm), including UV-A (315 nm-400 nm) and a portion of UV-B (280 nm-315 nm), "blue" (400 nm-499 nm), "green" and "yellow" (500 nm-599 nm), "red" (600 nm-699 nm), far-red (700 nm-799 nm) and some near infrared (800 nm-900 nm).

By neglecting to explicitly name these wavebands, this proposal does not address the ongoing problem of academic researchers and horticultural luminaire manufacturers referring to generic "blue," "green," "red," and "white" light sources. It further suffers from the same waveband overlap deficiencies of Craig and Runkle (2013), but for all wavebands.

This proposal also suffers from the wavebands being too broadly defined. Johkan, M. et al. 2012. "Effect of Green Light Wavelength and Intensity on Photomorphogenesis and Photosynthesis in *Lactuca sativa*," Environmental and Experimental Botany 75:128-133, provide an example wherein the growth and color of lettuce under quasimonochromatic radiation from "green" LEDs with center wavelengths of 510 nm (G510), 520 nm (G520), and 530 nm (G530) vary markedly depending on the center wavelength for the same photosynthetic photon flux density (FIG. 6). Plants were photographed 17 days after sowing. The bars indicate 8 cm. Total photosynthetic photon flux was 100, 200 and 300 µmol $m^{-2}$ $s^{-1}$.

The spectral absorptance characteristics of the primary plant photopigments chlorophyll A and B, beta-carotene, and phytochrome (FIG. 7) suggest that their absorptances vary very rapidly with changes in wavelength. However, these data represent the spectral absorptance of the pigment extracts dissolved in solvents (i.e., in vitro). As shown by Moss, R. A., and W. E. Loomis. 1952. "Absorption Spectra of Leaves. I. The Visible Spectrum," Plant Physiology 27(2):370-391, a combination of the structural complexity of the leaves, screening by other photopigments, and the presence of accessory photopigments have the effect of broadening the spectral absorptance characteristics of the photopigments in vivo (FIG. 8). Studies such as those of McCree, K. J. 1972. "The Action Spectrum, Absorptance and Quantum Yield of Photosynthesis in Crop Plants," Agricultural Meteorology 9:191-216 have shown that in general, plants are reasonably tolerant of small changes in the center wavelengths of quasimonochromatic radiation. Johkan et al. (2012) was likely an exception in that photosynthesis occurred due to beta-carotene rather than chlorophyll A/B, and longer wavelengths of green light were incapable of exciting this photopigment.

Maloney, L. 1986. "Evaluation of Linear Models of Surface Spectral Reflectance with Small Number of Parameters," J. Optical Society of America 3(10):1673-1683, discusses at length the physical basis of spectral reflectance distributions from natural objects, including organic materials. These distributions are band-limited by molecular interactions and superimposed vibrational/rotational patterns, with the result that the number of parameters needed to adequately represent spectral reflectance distributions in visible light (i.e., 400 nm-700 nm) is five to seven.

Westland, S. et al. 2000. "Colour Statistics of Natural and Man-made Surfaces," Sensor Review 20(1):50-55, came to a similar conclusion based on statistical studies of reflectance spectra, concluding that the spectral reflectance distributions form a set of band-limited functions with a frequency limit of approximately 0.02 cycles per nm. This implies that the visible light reflectance spectra can be adequately represented using six to twelve basis functions (e.g., Westland, S., and C. Ripamonti. 2004. "Computational Color Science using Matlab," Chapter 10. Chichester, UK: John Wiley & Sons).

FIG. 9 shows the spectral responsivity of an AS7262 6-channel visible light spectral sensor with a spectral range of approximately 430 nm to 570 nm, as manufactured by ams AG of Premstaetten, Austria. The characteristics of this device, however, do not satisfy the requirements of the present invention.

There is therefore a need for a system and method of classifying horticultural luminaire SPDs such that horticulturalists will have reasonable confidence that luminaires with similar SPDs will produce the same results when growing specific plant species.

Disclosed herein is a method of classifying the spectral power distribution (SPD) of a light source comprising the steps of: measuring, using a spectral sensor, an SPD of a light source; producing radial basis function weights for the SPD; fuzzifying the radial basis function weights; applying one or more fuzzy if-then rules to the fuzzified radial basis function weights to result in one or more output classes for the SPD; and determining, using the one or more output classes, a classification of the SPD.

Also disclosed herein is a system for classifying the spectral power distribution (SPD) of a light source comprising: a spectral sensor that measures an SPD of a light source; a database storing one or more fuzzy if-then rules; and one or more processors configured to: determine radial basis function weights for the SPD; fuzzify the radial basis function weights; apply the one or more fuzzy if-then rules to the fuzzified radial basis function weights to result in one or more output classes for the SPD; and determine, using the one or more output classes, a classification of the SPD.

DETAILED DESCRIPTION

Radial basis functions (e.g., Buhmann, M. D., and J. Jäger. 2000. "On Radial Basis Functions," Acta Numerica 9:1-38) can be used to approximate a real-valued function such as a spectral power distribution as a weighted sum of the basis functions. As an example, the set of Gaussian functions $\varphi(r, x_i) = e^{-((r-x_i)/\varepsilon)^2}$, where $\varepsilon = 12.5/\sqrt{-\ln(1/\sqrt{2})} = 21.233$ and $x_i = 350 + 25*i$ for $i = 0, \ldots, 18$, can be used to approximate any SPD from 350 nm to 800 nm (FIG. 10).

An advantage of this method is that the set of basis function weights is much smaller than the set of enumerated values for a measured SPD. Rather than referring to "red," "green," "blue," or "white" light, horticulturalists can state the values of a set of basis function weights. Moreover, a useful approximation of the original SPD significant to the needs of horticultural lighting can be reconstructed from these weights.

Figure 10:
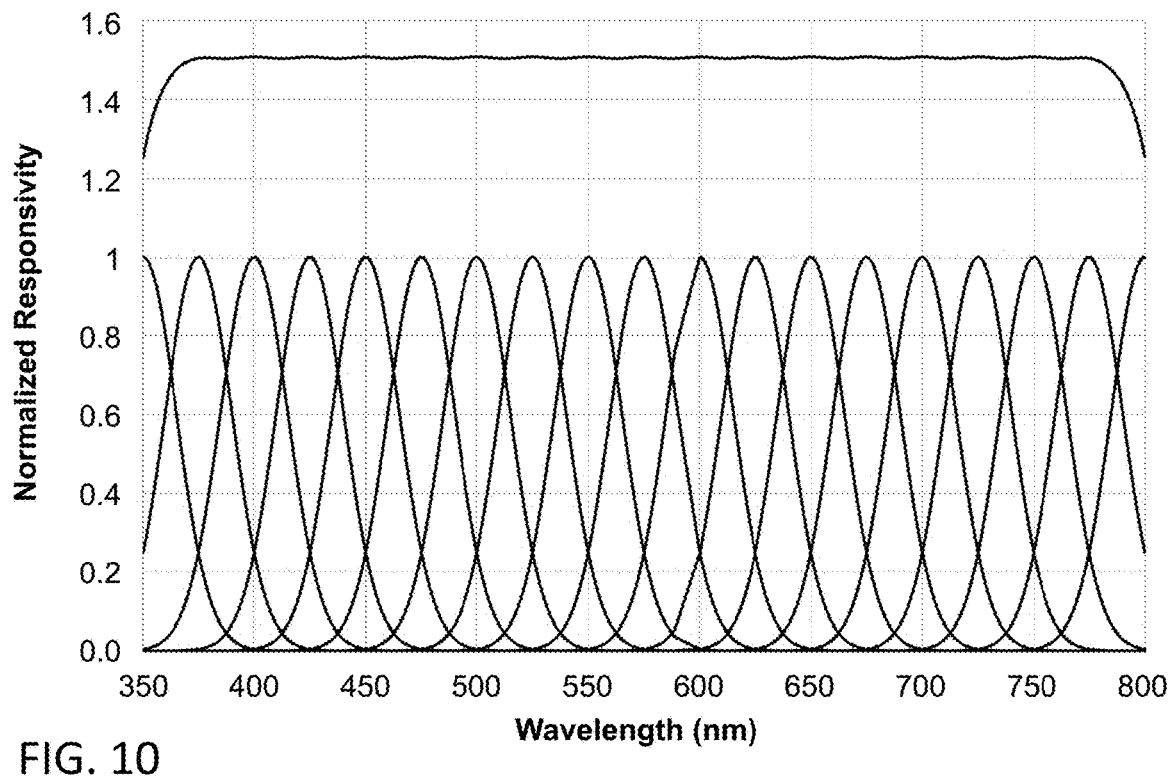
FIG. 10 shows the relative spectral responsivity of a calibrated radiant flux meter with 19 Gaussian spectral filters without compensation which, when combined, give a flat response from 375 nm to 775 nm, according to an embodiment of the present invention.

Referring to FIG. 10, each basis function can be seen as the responsivity of a radiant flux meter in combination with a Gaussian bandpass filter with a center wavelength of $x_i$. Combining the unweighted outputs of the 19 filtered meters results in a flat response from 375 nm to 775 nm. A substantially flat response may be understood to be level within ±3%. Presented with an arbitrary SPD, the filtered meter outputs represent the appropriate weighting for the basis functions to approximate the SPD. Moreover, the absolute values of the filtered meter outputs can be used to estimate the absolute spectral irradiance incident on the meters, from which can be calculated the absolute irradiance in watts per square meter and the photosynthetic photon flux density (PPFD) in micromoles per square meter per second.

Figure 11:
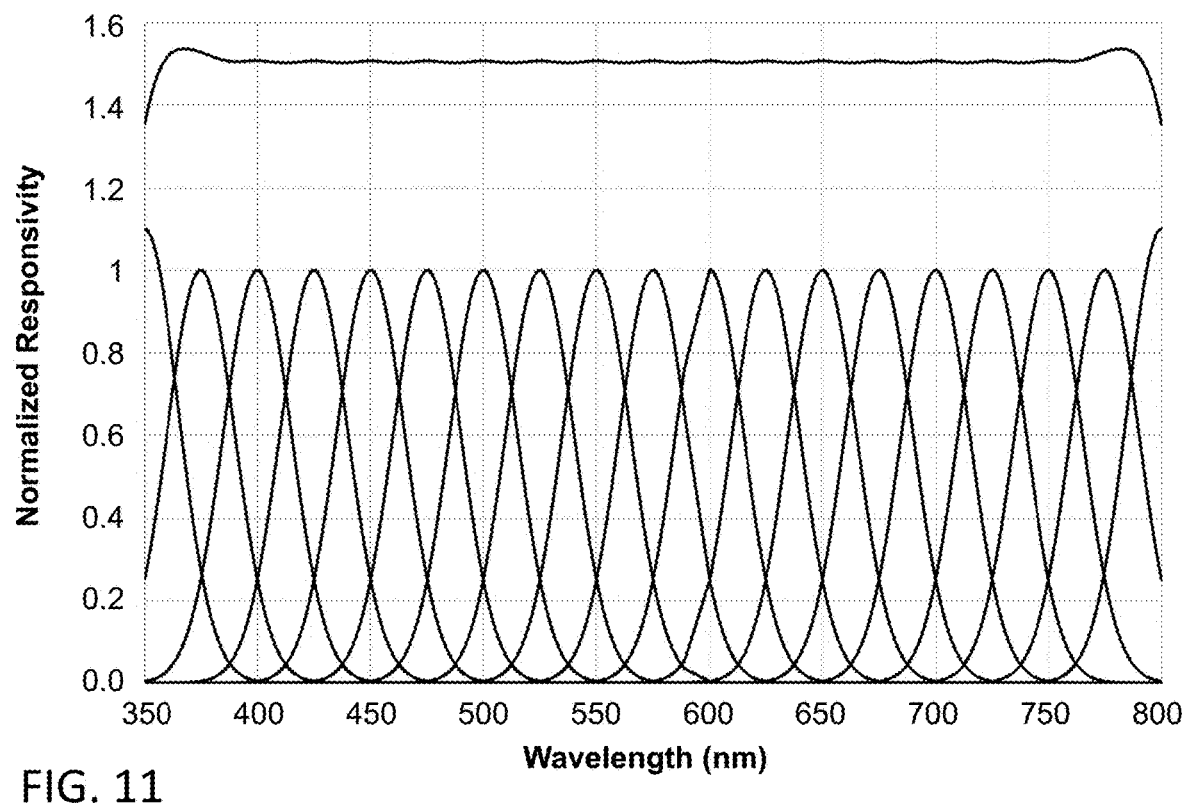
FIG. 11 shows the relative spectral responsivity of a calibrated radiant flux meter with 19 Gaussian spectral filters with compensation which, when combined, give a flat response from 360 nm to 790 nm, according to an embodiment of the present invention.

FIG. 10 also shows, however, a departure from the flat response between 350 nm and 375 nm, and between 775 nm and 800 nm. As shown in FIG. 11, increasing the gain of filtered radiant flux meters with 350 nm and 800 nm center wavelength bandpass filters by approximately 10 percent extends the substantially flat response range of the 19 filtered meters to between 360 nm and 790 nm.

Figure 1:
FIG. 1 shows a prior art product label for an architectural white light source.
Figure 2:
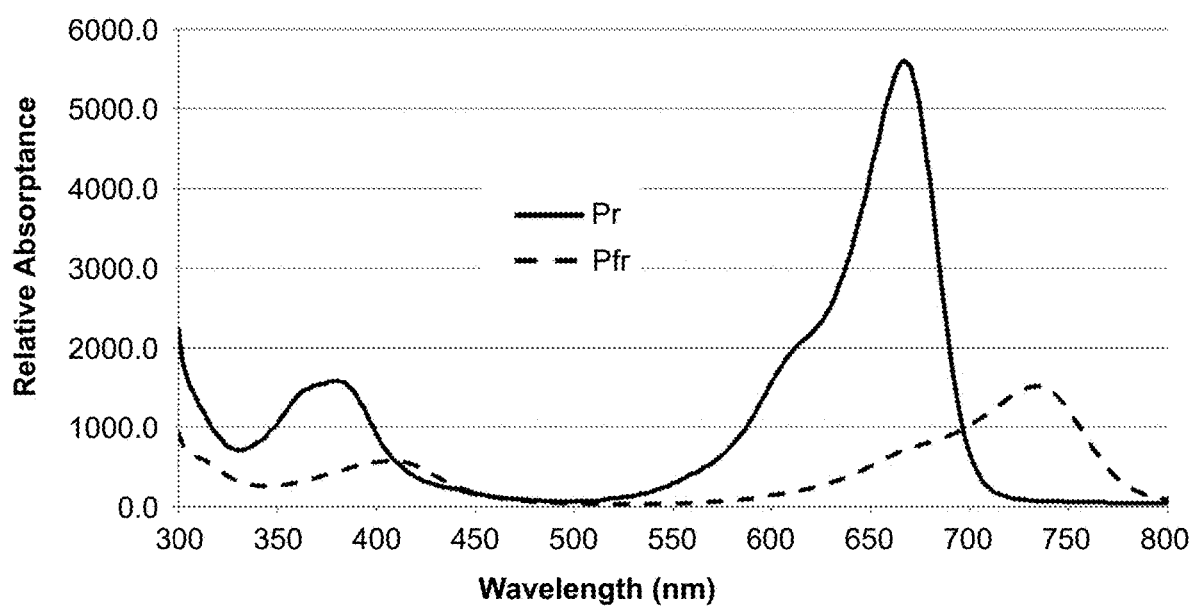
FIG. 2 shows the prior art spectral absorptance distributions of the $P_r$ and $P_{fr}$ isoforms of phytochrome.
Figure 3:
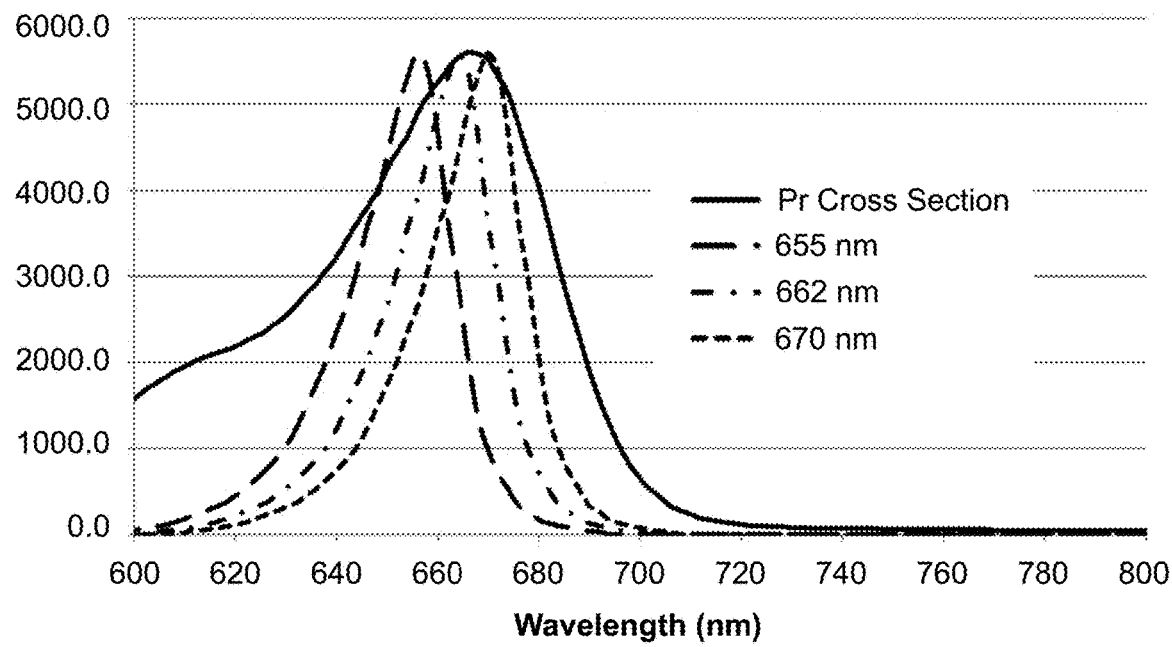
FIG. 3 shows a typical range of spectral power distributions of prior art red LEDs with a nominal 660 nm center wavelength, due to LED color binning tolerances.
Figure 4:
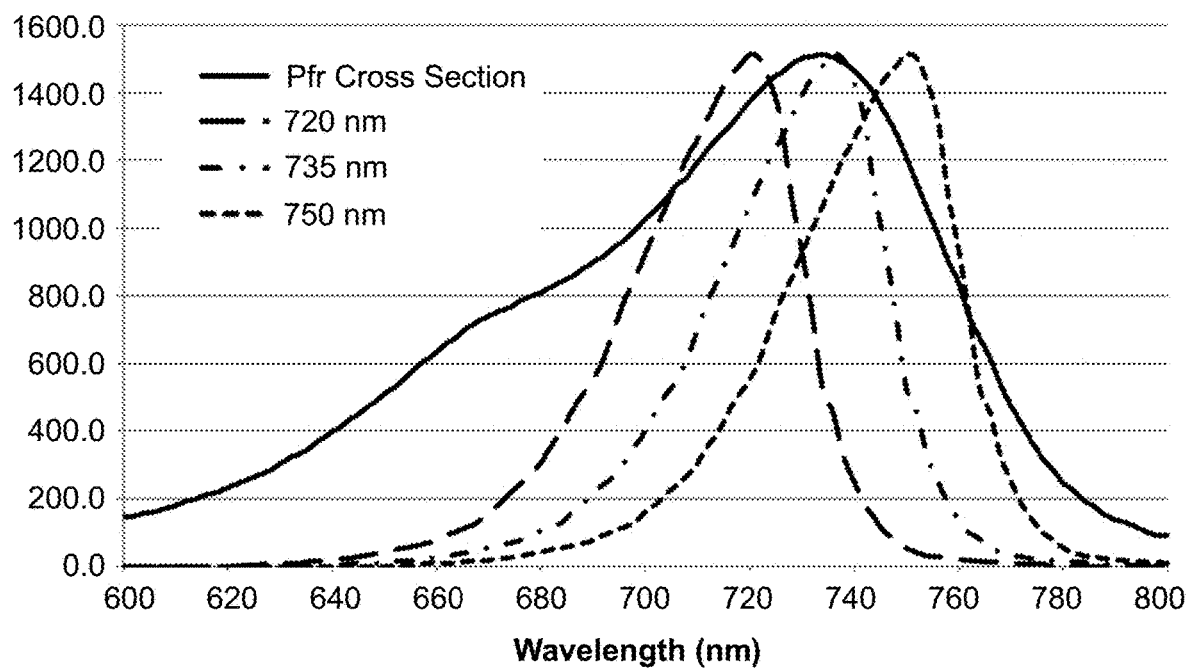
FIG. 4 shows a typical range of spectral power distributions of prior art far-red LEDs with a nominal 735 nm center wavelength, due to LED color binning tolerances.
Figure 5:
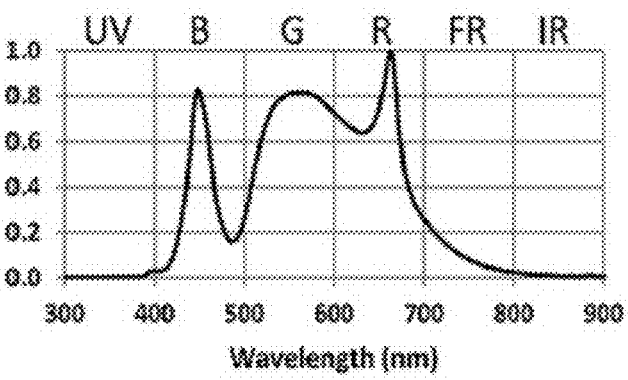
FIG. 5, prior art, shows a proposed product label for a horticultural light source.
Figure 6:
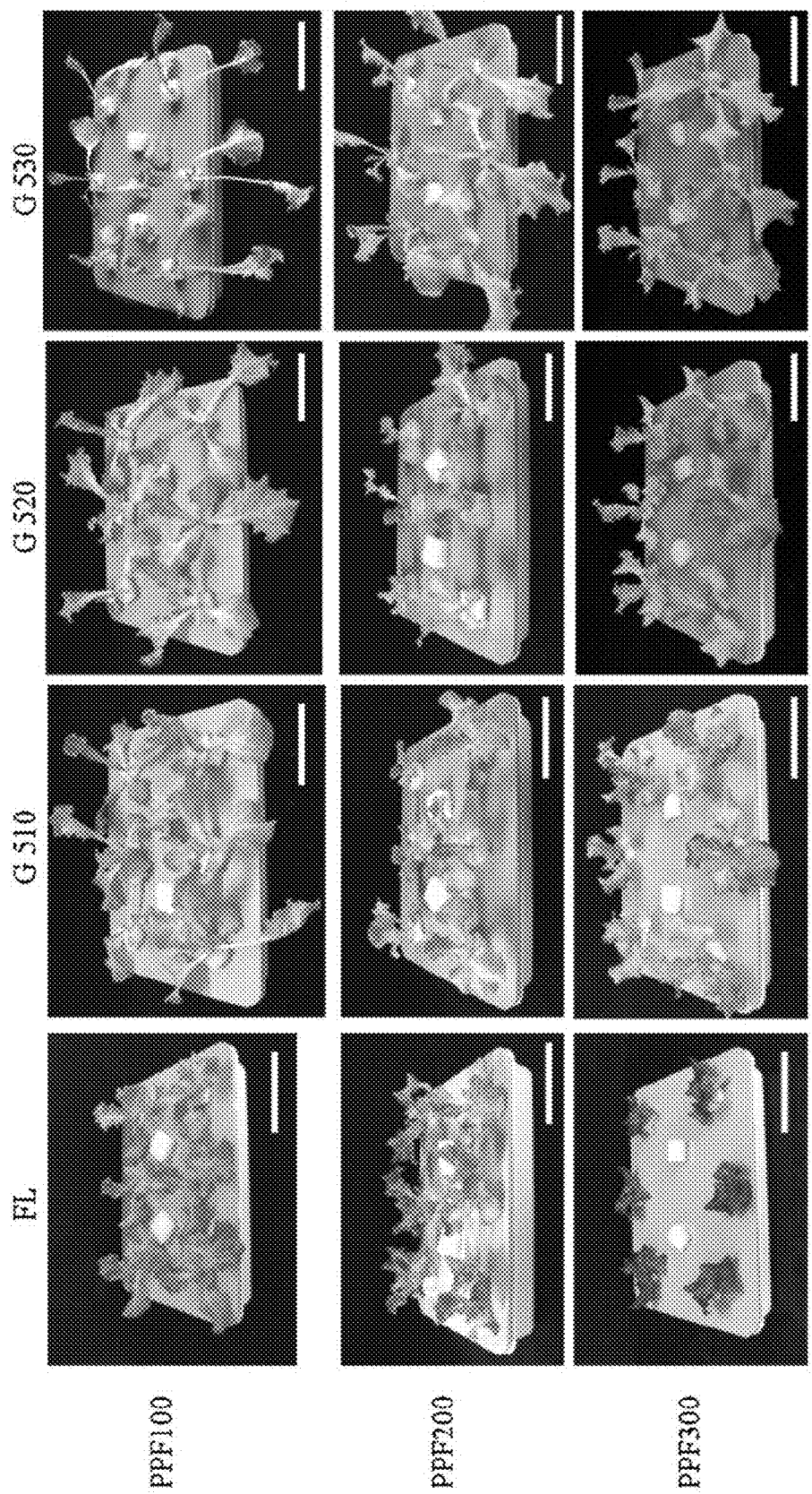
FIG. 6 shows the prior art effect of quasimonochromatic radiation with different center wavelengths on the growth and morphology of red lettuce.
Figure 7:
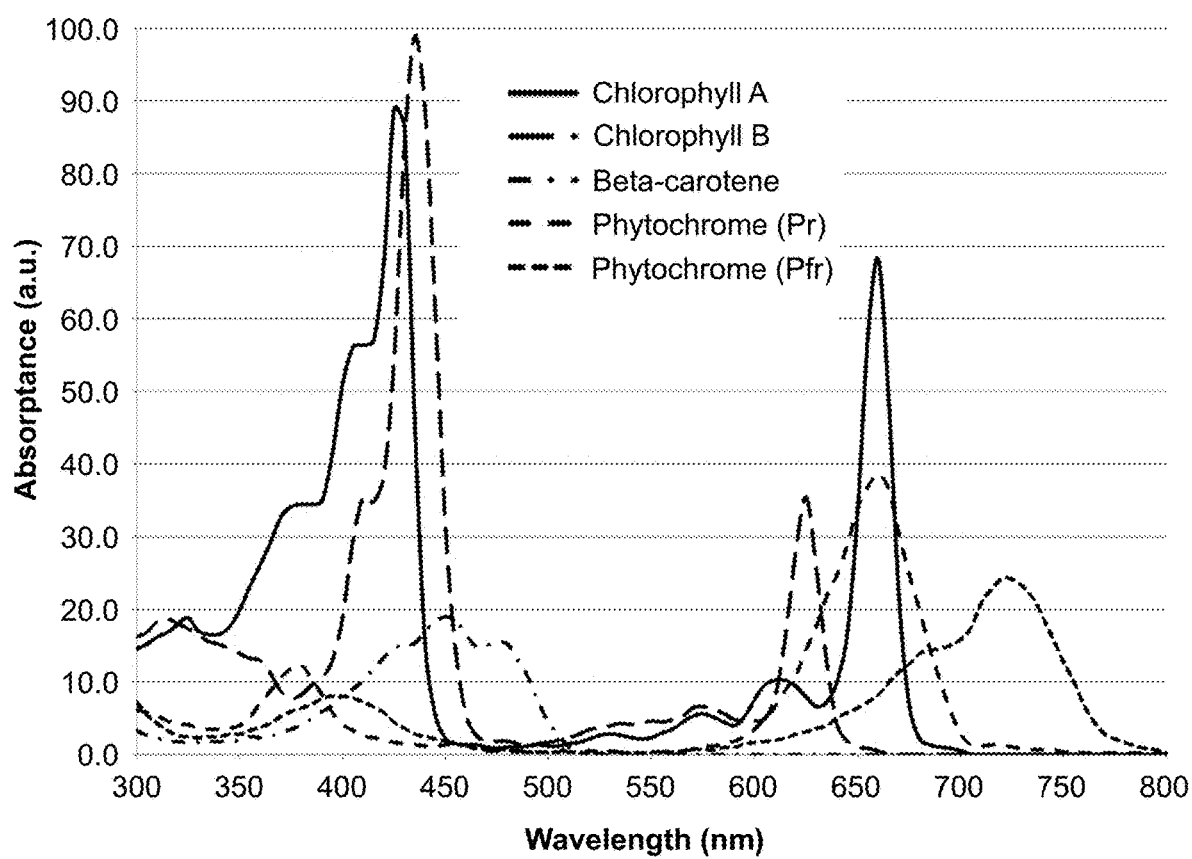
FIG. 7 shows the prior art spectral absorptance distributions of chlorophyll A and B, beta-carotene, and phytochrome.
Figure 8:
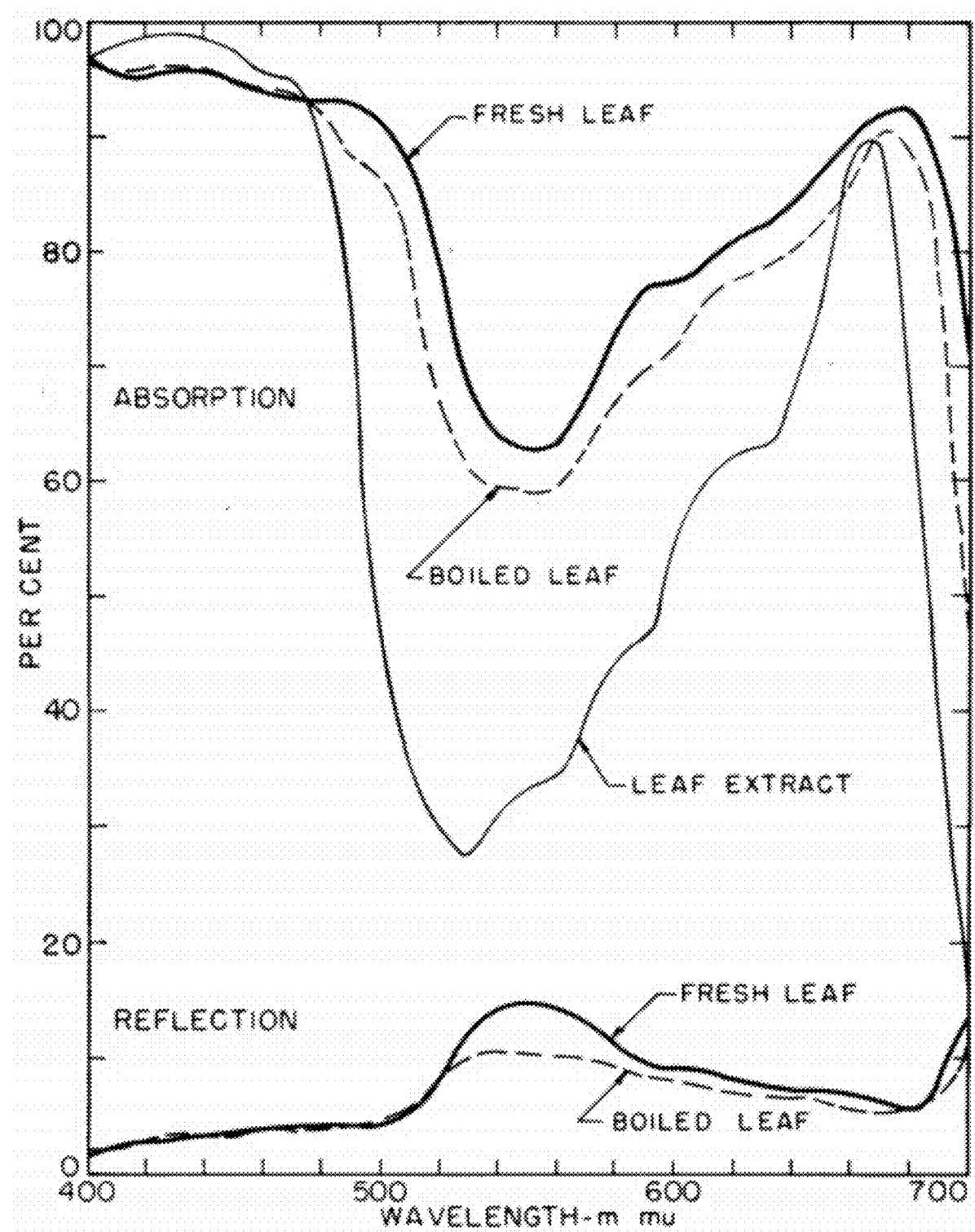
FIG. 8 shows the prior art spectral absorptance distribution broadening of photopigments when in vivo as opposed to in vitro.
Figure 9:
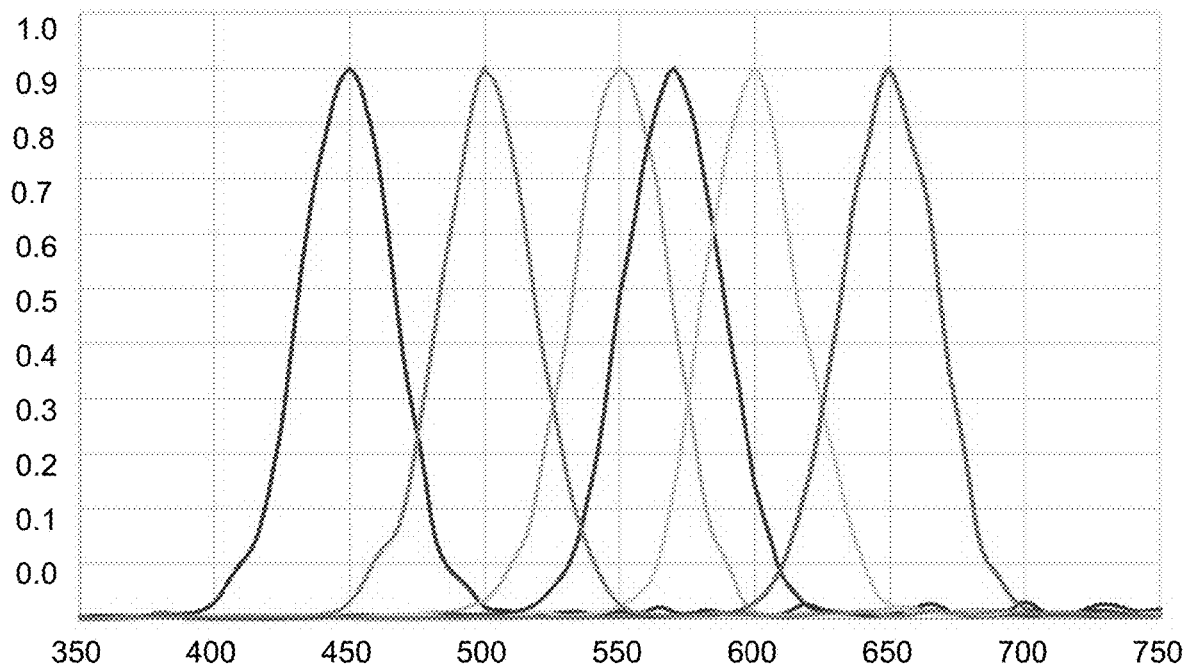
FIG. 9 shows the relative spectral responsivity of a prior art AMS AS7262 6-channel spectral sensor.
Figure 12:
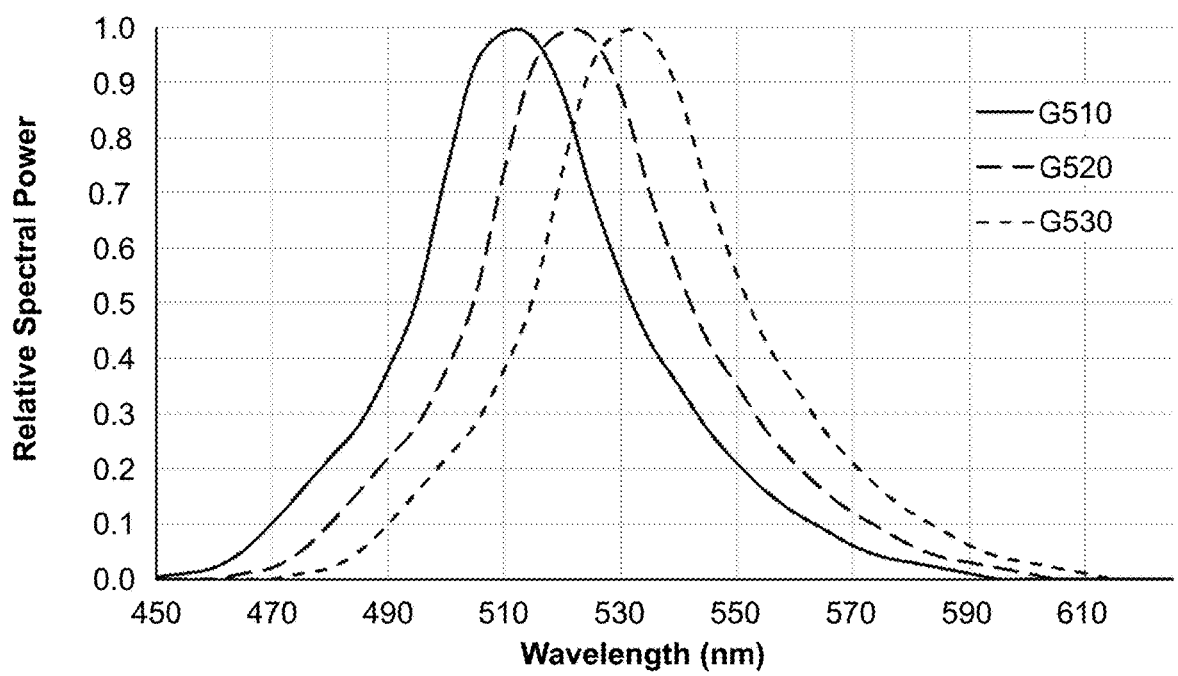
FIG. 12 shows the relative spectral power distribution of three prior art "green" LEDs with different center wavelengths.
Figure 13:
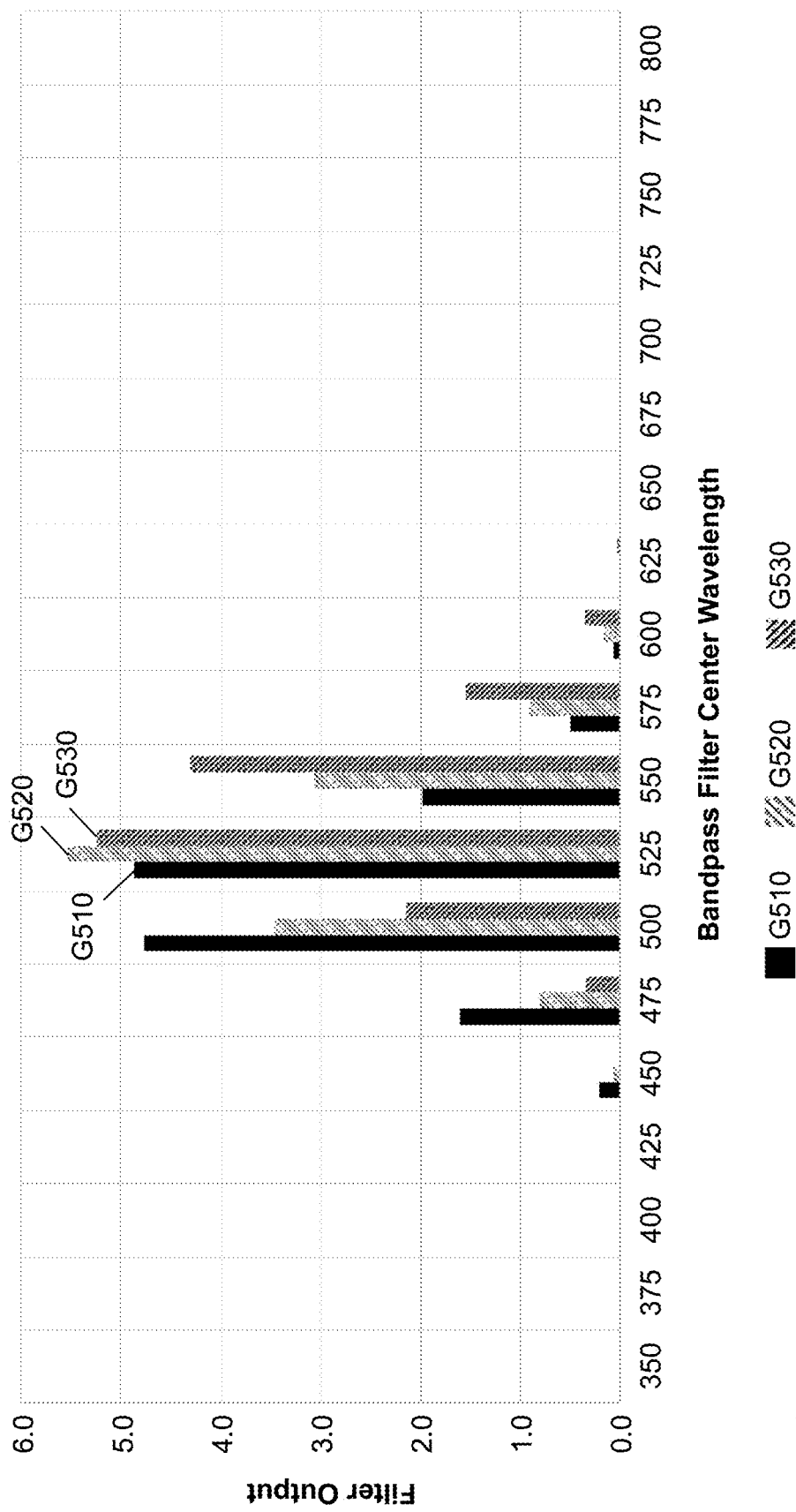
FIG. 13 shows the bandpass filter outputs for "green" LEDs with different center wavelengths, according to an embodiment of the present invention.

FIG. 12 shows the relative spectral power distributions of three quasimonochromatic "green" LEDs with center wavelengths of 510 nm (G510), 520 nm (G520) and 530 nm (G530) whose effect on the growth and development of *Lactuca sativa* (i.e., lettuce) is shown in FIG. 6. By multiplying these spectral power distributions on a per-wavelength basis with the bandpass filters shown in FIG. 10 and summing the results, the filter outputs are as plotted in FIG. 13. Even though the LEDs may be visually classified as "green," their bandpass filter outputs are clearly distinguishable. Each one of these LEDs would therefore be classified differently by the present invention, as each would lead to markedly different growth characteristics of at least some kinds of plants.

Other radial basis functions can be used to approximate arbitrary SPDs, including multiquadric, inverse quadratic, and inverse multiquadric functions, as well as polyharmonic and thin plate spines. Compactly-supported radial basis functions ("bump" functions) can also be used.

An advantage of the presently disclosed system and method in terms of horticultural light sources is that the spectral power distributions can be unambiguously measured and expressed as a small set of numbers, regardless of the SPD complexity. If the representations of two SPDs are similar, the horticulturalist may be assured that they will have the same biological effect on a plant species. As an example, white light fluorescent lamps typically exhibit a combination of continuum and line spectra, whereas white light LEDs typically exhibit a narrow peak emission near 450 nm and a broad continuum from the blends of green- and red-emitting phosphors. Regardless, if their set of radial basis function weights are similar, the two light sources may also be regardless as similar.

Figure 14:
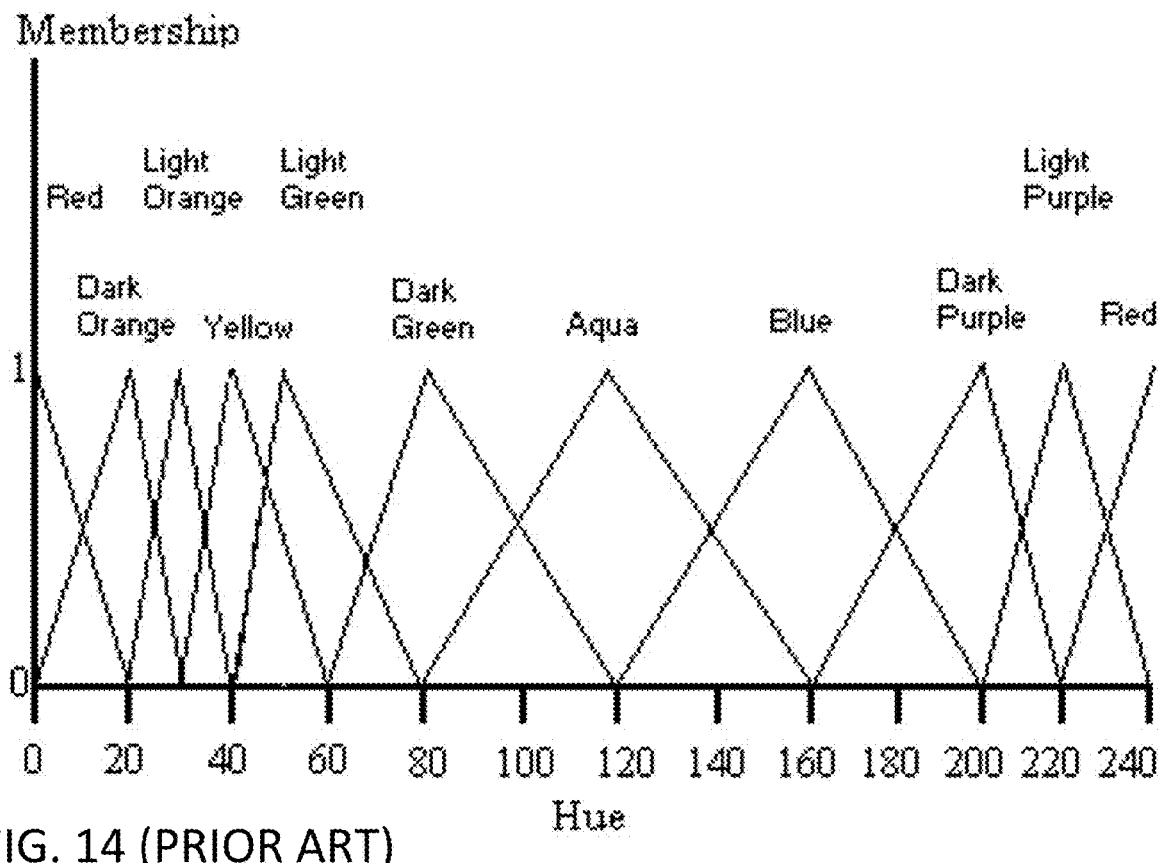
FIG. 14, prior art, shows ten fuzzy sets for hue defined on the HSV color space.

Shamir, L. 2006. "Human Perception-based Color Segmentation Using Fuzzy Logic," Proc. 2006 Int. Conference on Image Processing, Computer Vision & Pattern Recognition, Vol. 2. discusses the use of fuzzy logic in classifying color in images, based on fuzzy sets defined in the hue-saturation-value (HSV) color space and natural language rules. The author uses triangular fuzzy logic membership functions to define ten fuzzy sets for hue, five fuzzy sets for saturation, and four fuzzy sets for value. FIG. 14, for example, shows the ten fuzzy sets for hue, which colors are classified as according to their membership in red, dark orange, light orange, yellow, light green, dark green, aqua, blue, dark purple, and light purple. The red, green, and blue values of a pixel from an RGB image are converted into HSV triples, then fuzzified according to the three fuzzy sets. A set of 10×5×4=200 fuzzy rules is then used to perform fuzzy inference and classify the pixel color.

Figure 15:
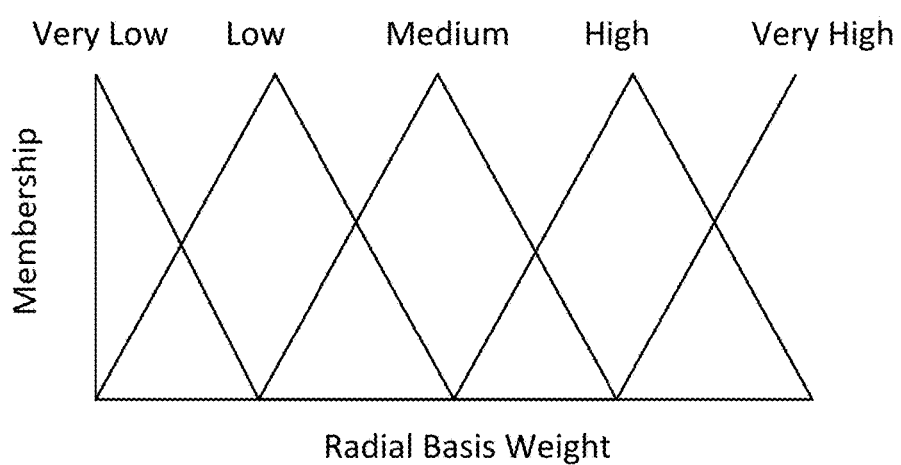
FIG. 15 shows five fuzzy sets for fuzzifying radial basis function weights preparatory to fuzzy logic classification, according to an embodiment of the present invention.
Figure 16:
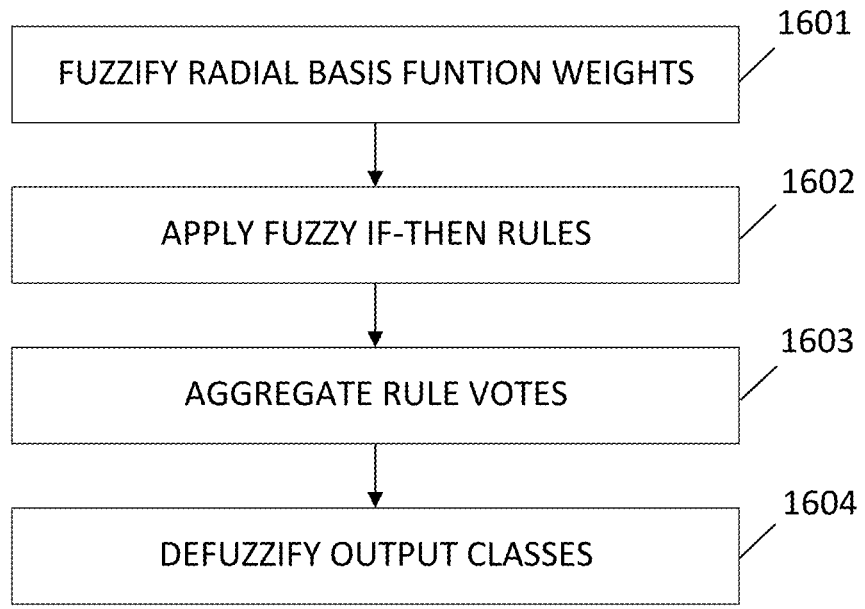
FIG. 16 shows a flowchart for fuzzy logic classification of spectral power distributions, according to an embodiment of the present invention.

A similar approach can be used to classify and compare SPDs for horticultural purposes. FIG. 15 shows a fuzzy set with members "very low," "low," "medium," "high," and "very high." Given a set of weights for 'n' radial basis functions representing an approximation of a given SPD (which can be either calculated from spectroradiometer measurements or measured using an n-channel spectral sensor as disclosed herein), the value of each weight is fuzzified as shown in Step 1601 of FIG. 16. For example, a given weight with a value of 0.60 may be determined to have 0.60 membership in "medium" and 0.40 membership in "high".

In Step 1602, the set of fuzzified weights are submitted to a fuzzy if-then rule system. If there are 'n' weights and the fuzzy set has 'm' members, then there are $m^n$ possible if-then rules. Given any two fuzzified weights $x_1$ and $x_2$ as inputs, each weight being for a different radial basis function, for example, a typical fuzzy rule will be:

IF $x_1$ is low AND $x_2$ is high THEN output class is 1

In a simple case, the output class "1" would then represent, for example, a classification of the SPD of a given luminaire, and the luminaire may be stamped with the classification and/or a label with the classification printed on packaging for the luminaire. Depending on the set of rules, the number of fuzzified weights and the membership values of the fuzzified weights, then there would be a number of different output classifications, each with its own label and each corresponding to a distinct group of similar SPDs. If luminaires are then labeled with their SPD classification, a horticulturist would be able to more easily select which luminaires to use for optimally growing a specific type of plant. In other embodiments, an alphanumeric classifier or meaningful name may be given to each output classification rather than a number.

However, application of a rule or a group of rules may not result in a definitive output class, but instead may output a vote for a particular class. Each rule calculates a "vote" τ that is determined by degree of membership μ for each fuzzified weight. For example, a vote for class "1" as defined by the typical fuzzy rule above may be:

$$\tau(x_1,x_2)=\mu_{low}(x_1) \text{ AND } \mu_{high}(x_2)$$

and where the AND operator is typically (but not necessarily) implemented as the minimum of the two membership values.

Once all of the rules have been processed, their votes are aggregated in Step 1603. While many different aggregation methods are possible, simply choosing the maximum values consists of:

$$\text{output class}=\max(\tau_i(x_j,x_k))$$

for all votes. The output class is then used as the classification of the SPD of the luminaire. In some embodiments, an SPD may be calculated to have fuzzy membership in one or more output classes. In this situation, Step 1604 may be required to defuzzify the output class memberships to produce a single classification. For example, if the output class memberships were 30% in class "2", 40% in class "3" and 30% in class "4", then the process of defuzzification may determine that the SPD is in class "3".

Figure 17:
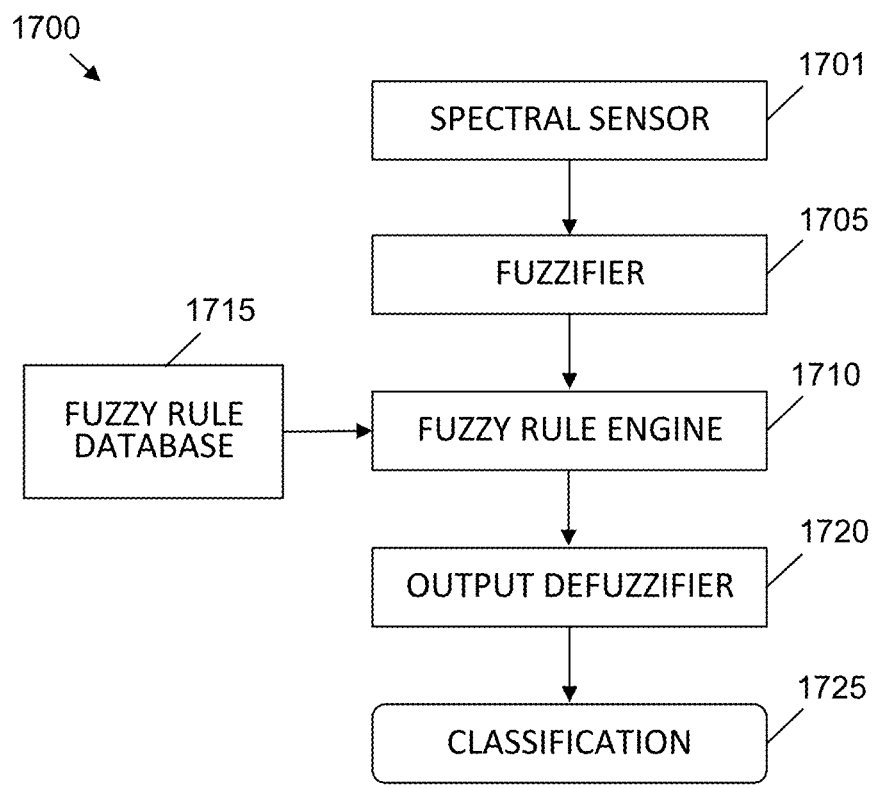
FIG. 17 shows a block diagram for a fuzzy logic classification system for spectral power distributions, according to an embodiment of the present invention.

FIG. 17 shows a block diagram of the modules of an exemplary fuzzy logic SPD classifier 1700, wherein a spectral sensor 1701 receives spectral irradiance from a light source (luminaire). The spectral sensor may be, for example, a multichannel spectral sensor, a spectroradiometer or a series of radiant flux meters in combination with Gaussian bandpass filters. The spectral sensor produces and sends a plurality of radial basis function weights to a fuzzifier module 1705. The fuzzified weights are then sent to a fuzzy rule engine 1710, which derives fuzzy if-then rules from a fuzzy rule database 1715 in accordance with the plant species, plant growth stage, plant environmental conditions, and other parameters as may be determined by the user (not shown). The selected rules are then executed on the fuzzified weights by the fuzzy rule engine 1710, which aggregates the rule votes and submits them to the output fuzzifier module 1720, which generates an SPD classification 1725. A display device for displaying the classification may also be included in the classifier. A printer or stamping machine may also be included to print the classification on the light source or light source packaging.

The fuzzy if-then rules may be developed from expert knowledge of the effect of similar but different SPDs on plant growth and health. They may also be developed automatically by training a neuro-fuzzy classifier. In one embodiment, the classifier is comprised of a three-layer feedforward neural network wherein the first layer fuzzifies the radial basis function weights, the middle layer represents the fuzzy if-then rules, and the third layer aggregates the rule votes. However, many other neuro-fuzzy classifier architectures are possible and may be employed.

The SPD classifier may also be used to compare two or more SPDs for similarity according to various metrics and requirements. For example, differences between radial basis function weights for 350 nm and 375 nm may be deemed less important than differences between the sum of these two weights for each SPD. Criteria such as these can be represented as more complex fuzzy if-then rules, which can be stored in a database for plant-specific requirements.

The SPD classifier may also be applied to other fields of lighting, including circadian lighting for humans and animals where there may be complex interactions between visually-perceived and non-visual light that serves to entrain circadian rhythms and other biological functions.

One or more modules of the SPD classifier may be embodied in a computing device, such as a laptop, desktop computer or server, for example, or any other electronic device that provides the necessary equivalent functionality to fulfill the requirements of the invention. The device is connected to and receives input from the spectral sensor 1701. The device includes one or more processors that are operably connected to computer readable memory included in the device. The SPD classifier includes computer readable instructions (e.g. an application) stored in the memory and computer readable data, also stored in the memory, for example in a database. The computer readable instructions may be broken down into blocks of code or modules. The memory may be divided into one or more constituent memories, of the same or different types. The device may include a display screen operably connected to the processor(s) and configured to display the classifications of the light sources after classification.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs one or more of the steps in the flowcharts, whether they are explicitly described as being executed by the processor or whether the execution thereby is implicit by being described as performed by a module. The processor, if comprised of multiple processors, may be located together or geographically separate from each other. The term includes virtual processors and machine instances as in cloud computing or local virtualization, which are ultimately grounded in physical processors.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Modules may be divided into constituent modules or combined into larger modules. Accordingly, the scope of the invention is to be construed in accordance with the substance defined by the following claims.

I claim:

1. A method of classifying the spectral power distribution (SPD) of a light source comprising the steps of: measuring, using a spectral sensor, an SPD of a light source; producing radial basis function weights for the SPD; fuzzifying the radial basis function weights; applying one or more fuzzy if-then rules to the fuzzified radial basis function weights to result in one or more output classes for the SPD; and determining, using the one or more output classes, a classification of the SPD.

2. The method of claim 1, wherein there is exactly one output class and the classification of the SPD is the output class.

3. The method of claim 1 comprising, when there are multiple output classes: determining, in the applying step, votes for the output classes; and aggregating, in the determining step, the votes to provide the classification of the SPD.

4. The method of claim 1, wherein: the applying step results in fuzzy membership of the SPD in multiple output classes; and the determining step comprises defuzzifying the multiple output classes to provide a single output class, which is the classification of the SPD.

5. The method of claim 1 comprising storing the one or more output classes in a database.

6. The method of claim 1 comprising displaying the classification of the SPD on a display device.

7. The method of claim 1, comprising printing the classification of the SPD on the light source or on packaging for the light source.

8. The method of claim 1, wherein the SPD is within an optical range.

9. The method of claim 1, wherein the producing, fuzzifying, applying and determining steps are performed by a processor.

10. The method of claim 1, wherein the producing step is performed by the spectral sensor.

11. The method of claim 1, wherein there are different output classes for quasimonochromatic light sources of the same nominal color and peak wavelengths differing by 10 nm.

12. The method of claim 1, wherein the radial basis functions, when combined, have a substantially flat response between 375 nm and 775 nm.

13. The method of claim 1, wherein the radial basis functions, when combined, have a substantially flat response between 360 nm and 790 nm.

14. The method of claim 1, wherein the radial basis functions are similar Gaussian, dissimilar Gaussian, multiquadric, inverse quadratic, inverse multiquadric, polyharmonic, thin plate spline or bump functions.

15. The method of claim 1, wherein there are 18 radial basis functions.

16. A system for classifying the spectral power distribution (SPD) of a light source comprising: a spectral sensor that measures an SPD of a light source; a database storing one or more fuzzy if-then rules; and one or more processors configured to: determine radial basis function weights for the SPD; fuzzify the radial basis function weights; apply the one or more fuzzy if-then rules to the fuzzified radial basis function weights to result in one or more output classes for the SPD; and determine, using the one or more output classes, a classification of the SPD.

17. The system of claim 16, wherein the one or more processors are configured to store the output classes in the database; determine votes for the output classes; aggregate the votes to provide the classification of the SPD; and when there is fuzzy membership in multiple output classes, defuzzify the multiple output classes to provide a single output class, which is the classification of the SPD.

18. The system of claim 16 comprising: a display connected to the processor and configured to display the classification of the SPD; and a printer configured to print the classification of the SPD on the light source or on packaging for the light source.

19. The system of claim 16, wherein one of the one or more processors is in the spectral sensor and configured to determine the radial basis function weights for the SPD.

* * * * *